United States Patent
Fields et al.

(10) Patent No.: US 11,485,650 B2
(45) Date of Patent: *Nov. 1, 2022

(54) SYSTEM FOR RECOVERING FAT, OIL AND GREASE FROM WASTEWATER

(71) Applicant: Besser Tech Holding LLC, Fairfield, NJ (US)

(72) Inventors: William Michael Fields, Highlands Ranch, CO (US); Yuanchun Xu, Highlands Ranch, CO (US); Guichun Zhang, Highlands Ranch, CO (US)

(73) Assignee: Besser Tech Holdings LLC, Fairfield, NJ (US)

( * ) Notice: Subject to any disclaimer, the term of this patent is extended or adjusted under 35 U.S.C. 154(b) by 268 days.

This patent is subject to a terminal disclaimer.

(21) Appl. No.: 16/629,066

(22) PCT Filed: Jul. 13, 2018

(86) PCT No.: PCT/US2018/042147
§ 371 (c)(1),
(2) Date: Jan. 7, 2020

(87) PCT Pub. No.: WO2019/014628
PCT Pub. Date: Jan. 17, 2019

(65) Prior Publication Data
US 2020/0131051 A1    Apr. 30, 2020

Related U.S. Application Data

(60) Provisional application No. 62/532,475, filed on Jul. 14, 2017.

(51) Int. Cl.
*C02F 1/24* (2006.01)
*B03D 1/14* (2006.01)
(Continued)

(52) U.S. Cl.
CPC .............. *C02F 1/24* (2013.01); *B03D 1/1406* (2013.01); *B03D 1/1431* (2013.01);
(Continued)

(58) Field of Classification Search
CPC .... C02F 1/24; C02F 1/006; C02F 1/78; C02F 2101/325; C02F 2103/32; C02F 2103/365;
(Continued)

(56) References Cited

U.S. PATENT DOCUMENTS

| 1,323,373 A | 12/1919 | Meyers |
| 2,679,477 A * | 5/1954 | Kivari ....................... C02F 1/24 |
| | | 210/608 |

(Continued)

FOREIGN PATENT DOCUMENTS

| CA | 2084647 A1 | 12/1991 |
| WO | WO9304784 | 3/1993 |

OTHER PUBLICATIONS

The PCT Search Report dated Nov. 28, 2018 for PCT application No. PCT/US2018/042147, 14 pages.

*Primary Examiner* — Nam X Nguyen
*Assistant Examiner* — Ekandra S. Miller-Cruz
(74) *Attorney, Agent, or Firm* — Wei Wei Jeang; Grable Martin Fulton PLLC

(57) ABSTRACT

A system for recovering fat, oil and grease (FOG) from wastewater has multiple annular flotation zones in a concentric configuration surrounding a central column to create progressively increasing surface areas for FOG and solid particles flotation, and thereby enhance FOG recovery and removal. Each flotation zone is equipped with an independent pressurized micro air and ozone bubbles distribution system. A controlled amount of ozone can be injected into the wastewater along with recirculated effluent and micro- (Continued)

size air bubbles. Upon the release of pressurized air-ozone-water mixture, micro-size bubbles are generated and distributed in each flotation zone to effectively float up FOG and solid particles in the wastewater stream.

10 Claims, 6 Drawing Sheets

(51) Int. Cl.
  *C02F 1/00* (2006.01)
  *C02F 1/78* (2006.01)
  *B03D 1/002* (2006.01)
  *C02F 101/32* (2006.01)
  *C02F 103/32* (2006.01)
  *C02F 103/36* (2006.01)
  *B03D 1/24* (2006.01)

(52) U.S. Cl.
  CPC ......... *B03D 1/1462* (2013.01); *B03D 1/1493* (2013.01); *B03D 1/242* (2013.01); *C02F 1/006* (2013.01); *C02F 1/78* (2013.01); *B03D 1/002* (2013.01); *B03D 2203/008* (2013.01); *C02F 2101/325* (2013.01); *C02F 2103/32* (2013.01); *C02F 2103/365* (2013.01); *C02F 2201/007* (2013.01); *C02F 2301/028* (2013.01); *C02F 2301/046* (2013.01); *C02F 2301/08* (2013.01); *C02F 2303/04* (2013.01); *C02F 2303/26* (2013.01); *C02F 2305/023* (2013.01)

(58) Field of Classification Search
  CPC .......... C02F 2201/007; C02F 2301/028; C02F 2301/046; C02F 2301/08; C02F 2303/04; C02F 2303/26; C02F 2305/023; C02F 3/20; C02F 2101/32; C02F 2103/10; C02F 2103/22; C02F 2103/343; C02F 2201/003; B03D 1/1406; B03D 1/1431; B03D 1/1462; B03D 1/1493; B03D 1/242; B03D 1/002; B03D 2203/008; B03D 1/1468; Y02W 10/10
  USPC ........................................................ 210/221
  See application file for complete search history.

(56) References Cited

U.S. PATENT DOCUMENTS

| | | | | |
|---|---|---|---|---|
| 4,156,648 | A | * | 5/1979 | Kuepper .................. C02F 1/24 209/164 |
| 5,028,315 | A | | 7/1991 | Cruea et al. |
| 5,306,422 | A | * | 4/1994 | Krofta .................. B03D 1/1462 210/151 |
| 5,509,535 | A | | 4/1996 | Schneider |
| 5,830,351 | A | * | 11/1998 | Adams, Jr. .............. C02F 3/223 210/195.3 |
| 2014/0076802 | A1 | * | 3/2014 | Kawagishi .............. C02F 3/208 210/620 |
| 2015/0053600 | A1 | | 2/2015 | Kirk et al. |

* cited by examiner

US 11,485,650 B2

SYSTEM FOR RECOVERING FAT, OIL AND GREASE FROM WASTEWATER

CROSS-REFERENCE TO RELATED APPLICATION(S)

This application is a U.S. national stage application under 35 USC § 371 of International Application No. PCT/US2018/042147 filed on Jul. 13, 2018 and entitled "SYSTEM FOR RECOVERING FAT, OIL AND GREASE FROM WASTEWATER, which claims priority to U.S. Provisional Application No. 62/532,475 filed on Jul. 14, 2017 and entitled "SYSTEM FOR RECOVERING FAT, OIL AND GREASE FROM WASTEWATER," the entire contents of which are incorporated herein by reference.

BACKGROUND

Wastewater containing fat, oil, and grease (FOG) is usually generated from animal killing and meat processing, food processing, trap grease in restaurants, and flowback and produced water in oil and gas exploration and production. When the wastewater is discharged either a city sewer, leachate land, aeration pond, or lagoon, FOG can cause: (1) plugging of private lateral sewer lines; (2) blockage of sanitary sewer lines; (3) sewage overflow, spill, and backup to households; clogging of soil pores and leachate fields; (4) an anaerobic condition in sewers and odor issues; (5) the introduction of high-strength organic matter to downstream city wastewater treatment plants (WWTP); and (6) increased operation and maintenance cost of (WWTP).

In general, wastewater containing FOG is usually produced as a result of animal or meat processing, food processing (such as in a restaurant grease trap), and oil and gas exploration and production (e.g., as part of flowback and produced water). In some instances, plants or facilities have installed dissolved air flotation (DAF) units. However, conventional DAF units commonly have low FOG recovery and removal efficiency.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
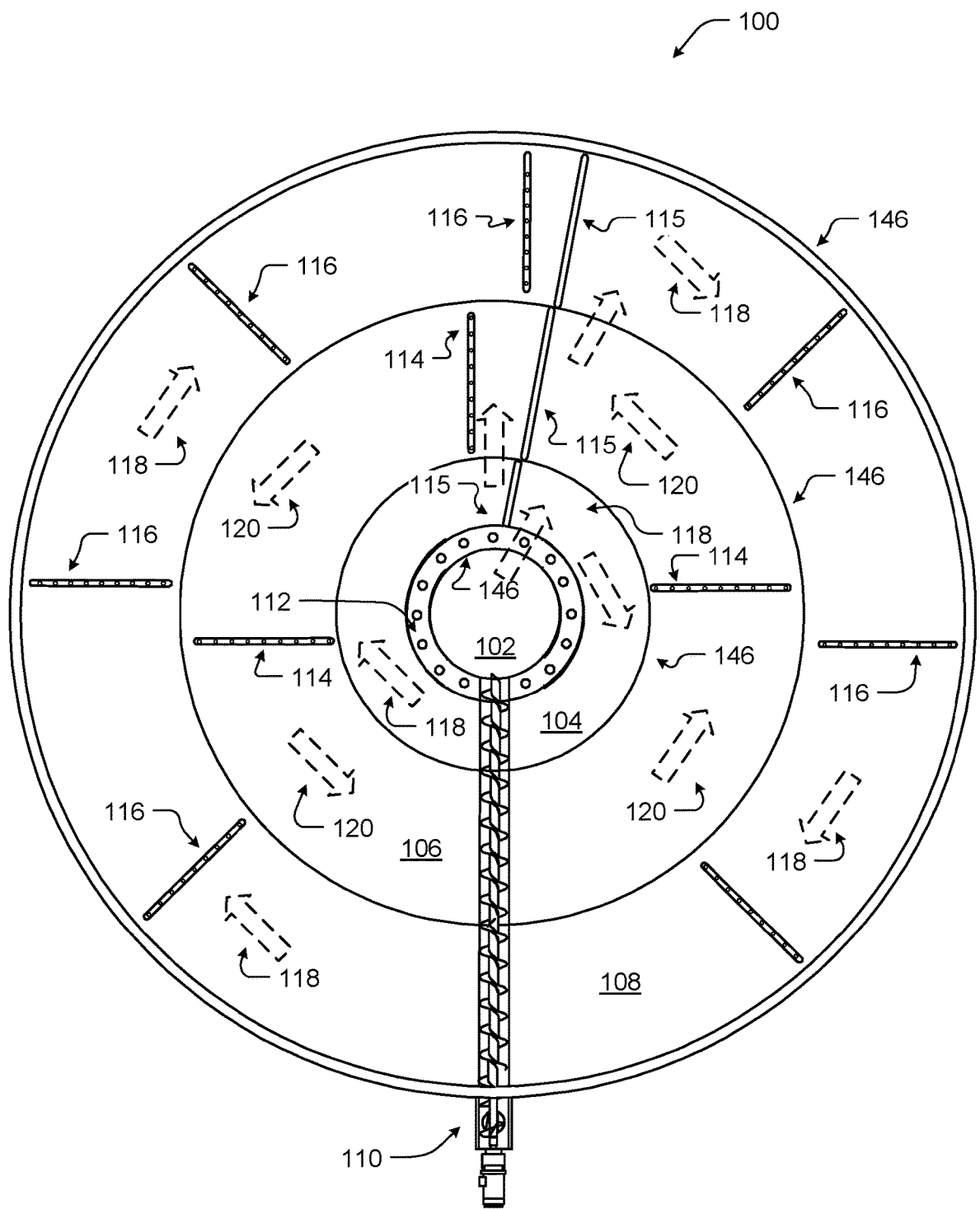
FIG. 1 illustrates a top view of an example system for processing wastewater according to some implementations.

This disclosure includes techniques and implementations for cleaning and recovering fat, oil, and grease (FOG) from wastewater. For example, in some implementations, a recovery system includes a Circular Zoned Dissolved Air and Ozone Flotation (CZDAOF) unit for recovering fat, oil, and grease from wastewater that employs a series of flotation zones in a concentric arrangement about a central column to create progressively increased surface areas for flotation of FOG and solid particles to thereby enhance FOG recovery is discussed herein. In one implementation, the system for recovering FOG from wastewater is configured to produce disposable waste or sludge, usable effluent (e.g., the cleaned waste water), and various FOGs, such as oil and/or yellow grease, that have commercial marketability.

Thus, the system discussed above may be used to process water used in the food processing, oil and gas exploration and production, pharmaceutical, agricultural, municipal wastewater pre-treatments industries. In general, wastewater containing FOG is usually produced as a result of animal or meat processing, food processing (such as in a restaurant grease trap), and oil and gas exploration and production (e.g., as part of flowback and produced water), as well as in other industries. For example, in animal and meat processing plants and food processing industries, FOG content in industrial wastewater is typically in the range of 300-3000 mg/L. In these cases, the source of FOG is relatively simple, and FOG has usually not been cross contaminated by other pollutants. Thus, the recovered FOG may be purified to produce yellow grease. Yellow grease feedstock is a valuable commodity and may be used for the productions of tallow, animal feed supplements, biopharmaceutical, biodiesel, and other products. Conventionally, the yellow grease generated in most of restaurants is collected by rendering plants. However, prior to processing, the trap grease is commonly trucked out by a local truck hauler and dumped at a disposal site. Most of these conventual trap grease disposal facilities only have serially-connected tanks to decant the grease and do not have CZDAOF units. The treated effluent in trap grease disposal facilities usually contains very high biochemical oxygen demand (BOD) and total suspended solids (TSS) loadings and can cause serious problems in downstream city WWTP, oxidation pond, lagoon, and leachate field operations.

In addition, it has generally been impractical for conventual poultry, beef and pork processors, as well as brown grease haulers to treat and recover the oil without using large quantities of chemicals. Not only is the use of chemicals expensive, but, the use of such chemicals often destroys the attributes of the FOG to be converted into yellow grease and bio-fuels. Currently, about 90% of the oil coming from grease traps is either being sent to municipal plants or to industrial treatment plants, meaning that most of the oil being collected from grease traps is wasted. Not only is this a loss of a valuable resource in bio-fuel, but the cost to taxpayers to treat brown grease waste at conventional municipal plants is in the tens of millions of dollars per year. In addition, municipal treatment plants have been required to expand their current facilities to deal with FOG in wastewater, at the cost of hundreds of millions of dollars in capital expenditures. Thus, the system discussed herein can not only be used to generate a clean bio-fuel, but can also save hundreds of millions of dollars in capital expenditures for municipal treatment plants.

In one implementation, the system may include a central entry column and multiple flotation zones that are arranged in concentric series around the central entry column. In some cases, the system may be configured with annular flotation zones that have a conical shaped or sloped exterior/bottom wall(s). For example, the depth of each of the consecutive flotation zone may be reduced to allow for the waste sludge to be collected via one or more bottom sludge discharge ports. In some cases, the central entry column may be configured to maximize oil recovery due to the low entry velocities of wastewater and FOG. The ability of the central entry column to trap any large solids or heavies helps to protect the subsequent surrounding flotation zones from plugging or fouling the bottom sludge discharge ports.

In some cases, each of the flotation zones as well as the central entry column may include independent pressured dissolved air diffusers that introduce microbubbles into the wastewater. The microbubbles attach on the surface of FOG or suspended solid particles within the wastewater. The attached microbubbles then cause the FOGs or particles to float upward where the FOGs or particles may be extracted from the wastewater. In some cases, different type of microbubbles may be introduced in different flotation zones, as each zone includes an independent diffuser and pump. For example, flotation zones introducing ozone, oxygen, nitrogen, and/or a combination thereof may be implemented. Additionally, when processing particular types of wastewater, chemical additives or biological agents may also be introduced into the wastewater, such as via exterior flotation zones or polishing zones.

The system may include at least one scum scraper assembly positioned along the top of the system to remove the FOG and solid particle scum from the surface of the wastewater within each of the flotation zones and deposit the FOG and solid particle scum into a scum collection trough. For example, as the microbubbles raise the FOG and solid particle scum to the surface, the scum scraper assembly may skim, trap, and remove the FOG from the system.

In some cases, the flow direction of the wastewater is reversed in each successive flotation zone. This countercurrent flow pattern (known as a "plug flow pattern") slows the rate of travel of the wastewater through the system, increased exposure of the wastewater to the flotation zones, thereby increasing chances for FOG to attach to the microbubbles and be removed by the scrum scraper assembly.

In some implementations, the system may be configured to introduce the microbubbles into the system via recirculated effluent. For example, the system may dissolve the microbubbles into effluent produced by the system and then reintroduce the effluent into to the flotation zones via the independent pressured dissolved air diffusers. For example, the system may include an effluent reservoir (such as via a weir tank) coupled to an exit port of the exterior flotation zone (e.g., the final flotation zone or the polishing zone) to collect the effluent after the sludge and the FOGs have been removed.

The system may also include an integrated air and/or ozone dissolving system coupled to the effluent weir tank such that the integrated air and/or ozone dissolving system may receive at least a portion of the effluent produced by the system from the reservoir. The integrated air and/or ozone dissolving system may include a number of pumps to dissolve the microbubbles into the effluent. In some examples, the number of pumps may be equal to the number of flotation zones including the central entry column. In this manner, the system may allow for different types or amounts of gases to be dissolved in the effluent introduced into each of the flotation zones (e.g., each pump may introduce an independent amount or type of gas into the effluent for a corresponding independent flotation zone). In some implementations, the number of pumps may exceed the number of flotation zones, such that two or more pumps may be used to introduce multiple types of gases into the effluent to cause multiple types of microbubbles to be released into a particular flotation zone (e.g., both oxygen and/or ozone may be introduced into a single flotation zone).

In some cases, the system may be configured to have a modular design. The modular design of system also enables the unit to be split into smaller modular components for easier shipping and allows for a unit of any desired diameter or number of flotation zones to be constructed on-site (such as the oil field). Additionally, the circular walls between the flotation zones may be formed from thinner material, due to the inherent strength provided by cylindrical symmetry. For example, allowing the use of thinner stainless steel provides a cheaper manufacturing alternative and lower maintenance costs than conventional designs.

In one particular example, in situations where chemicals may be required to treat the wastewater, the system discussed herein may be used to remove large amounts of solids and oils without chemicals in the initial flotation zones. Smaller amounts of chemicals may then be used in the outer flotation zone(s) for fine particle removal, and other chemical treatments. In this example, as much as 70 to 80 percent of the FOGs may been removed prior to introduction of chemicals to the wastewater, resulting in reduced operating costs and chemical wastage in comparison to conventional CZDAOF clarification systems. Additionally, as the system discussed herein also allows for the recovery of the fats and/or oils in a raw form. In some cases, the introduction of ozone or ozone in combination with other gases/chemicals as microbubbles into the flotation zones allows the ozone to break up any emulsified colloidal oil and/or FOGs, thereby enhancing oil and FOG produced by the system.

FIG. 1 illustrates a top view of an example system 100 for processing wastewater according to some implementations. The system 100 may be configured to produce effluent and to recover fat, oil, and grease from wastewater. The system may include a central column 102 and a series of flotation zones, such as flotation zones 104, 106, and 108, arranged about the central column 102.

In the current example, the wastewater is received from a source (not shown) at the lower or bottom portion of the central column 102. The source of the wastewater may be from a food processing plant (such as a slaughter house or restaurant), oil and gas exploration and production facility (such as an oil well), pharmaceutical plant, agricultural facility, municipal wastewater system, among others. The central column 102 may be configured to introduce microbubbles via pressurized recirculated effluent to the wastewater. For instance, in one example, the pressurized recirculated effluent containing the mixture of dissolved air and/or ozone is introduced to the wastewater (e.g., the raw FOG-containing effluent) via a diffuser pipe (not shown). Upon release to the atmosphere, the dissolved air and/or ozone in the pressurized recirculated effluent generates numerous micro-size bubbles. The bubbles attach on the surface of the FOG or suspended solid particles and cause the FOG and the particles to float upward within the central column 102. The FOG and the particles may then be removed from the surface of the wastewater by a scum collection trough 110, discussed in more detail below. In this example, as much as 70 to 80 percent of the FOGs and the particles may been removed by the central column 102.

Once the wastewater has passed up and through the central column 102, the wastewater may enter the first inflation zone 104. Thus, the first flotation zone 104 extends radially around the central column 102 and is in fluid communication with the central column 102. Similar to the central column 102, the first flotation zone 104 may introduce microbubbles into the wastewater by introducing additional pressurized recirculated effluent via at least one diffuser 112. In the illustrated example, the dissolved air diffusers 112 is a circular dissolved air diffuser, however, in other examples, the diffuser 112 may be multiple dissolved air diffusers evenly distributed around the first flotation zone 104.

In some cases, the microbubbles may again be dissolved air and/or ozone. However, in some examples, the microbubbles may be other dissolved gases, such as nitrogen. The gases dissolved may depend on the use of the system 100 and the type of wastewater being processed. Once again, the microbubbles may attach to additional FOGs and suspended solid particles in the wastewater to raise the additional FOGs and suspended solid particle to the surface for removal from the effluent by the scum collection trough 110. In the first flotation zone 104 the microbubbles have more residence time to attach on the surface of the FOG and solid particles and float up the aggregate to the surface than in the central column 102.

A second flotation zone 106 extends radially outward around the first flotation zone 104 and is configured in fluid communication with the first flotation zone 104, such that when the wastewater exits the first flotation zone 104, the wastewater enters the second flotation zone 106. In various implementations, the system 100 may be configured with baffles, such as baffles 115, that allow the wastewater within the flotation zones 104-108 to flow in different directions. For instance, in some examples, the baffles 115 may be configured such that the wastewater within the first flotation zone 104 flows in a first direction, generally indicated by 118, opposite a second direction, generally indicated by 120, to the wastewater within the second flotation zone 106. For instance, in the illustrated example, the wastewater in the first flotation zone 104 flows in a clockwise direction while the wastewater in the second flotation zone 106 flows in a counter-clockwise direction. Alternately, the wastewater in the first flotation zone 104 flows in a counter-clockwise direction while the wastewater in the second flotation zone 106 flows in a clockwise direction. By changing the direction of flow of the wastewater using baffles 115 within each flotation zone 104-108, the system 100 can slow the rate of flow of the wastewater and, thereby, increase the time the wastewater is within each flotation zone 104-108 and in the overall system 100. The increased time within the system 100 results in an increase the amount of FOGs and solid particles that may be removed from the resulting effluent produced by the system 100, as more particles are floated and removed via the scum collection trough 110. In some cases, the baffles 115 may include textures, protrusions, or other configurations that may cause the wastewater to be disturbed and/or slow.

Within the second flotation zone 106, microbubbles of dissolved gases, such as air and/or ozone, are again injected through a number of dissolved air diffusers 114 spaced around the central column 102 of the system 100. Again, the microbubbles may attach to additional FOGs and suspended solid particles not removed in the central column 102 or the first flotation zone 104. The FOGs and particles attached to the microbubbles in the wastewater again raise to the surface and may be collected in the scum collection trough 110.

In the illustrated example, a third flotation zone 108 extends radially outward around the second flotation zone 106 and is configured in fluid communication with the second flotation zone 106, such that when the wastewater exits the second flotation zone 106, the wastewater enters the third flotation zone 108. The system 100 is further configured such that the wastewater within the third flotation zone 108 flows in the first direction 118 opposite the second direction 120 of the wastewater within the second flotation zone 106 (e.g., the wastewater in the third flotation zone 108 flows in the same direction as the wastewater within the first flotation zone 104). Again, by changing the direction of flow of the wastewater within each flotation zone 104-108, the system 100 is able to slow the rate of flow of the wastewater and, thereby, increase the amount of FOGs and solid particles that may be removed from the resulting effluent produced by the system 100.

Within the third flotation zone 108, microbubbles of dissolved gases, such as air and/or ozone, are again injected through a number of dissolved air diffusers 116 spaced around the central column 102 of the system 100. Again, the microbubbles may attach to additional FOGs and suspended solid particles not removed in the central column 102, the first flotation zone 104, or the second flotation zone 106. The FOGs and particles attached to the microbubbles in the wastewater again raise to the surface and may be collected in the scum collection trough 110.

In the various implementations discussed herein, the relative sizes of each of the flotation zones 104-108 may vary and may be determined based on process requirements of the wastewater. In some cases, the flotation zones 104-108 may be separated by vertical zone walls 146 that are arranged in concentric configuration.

Figure 2:
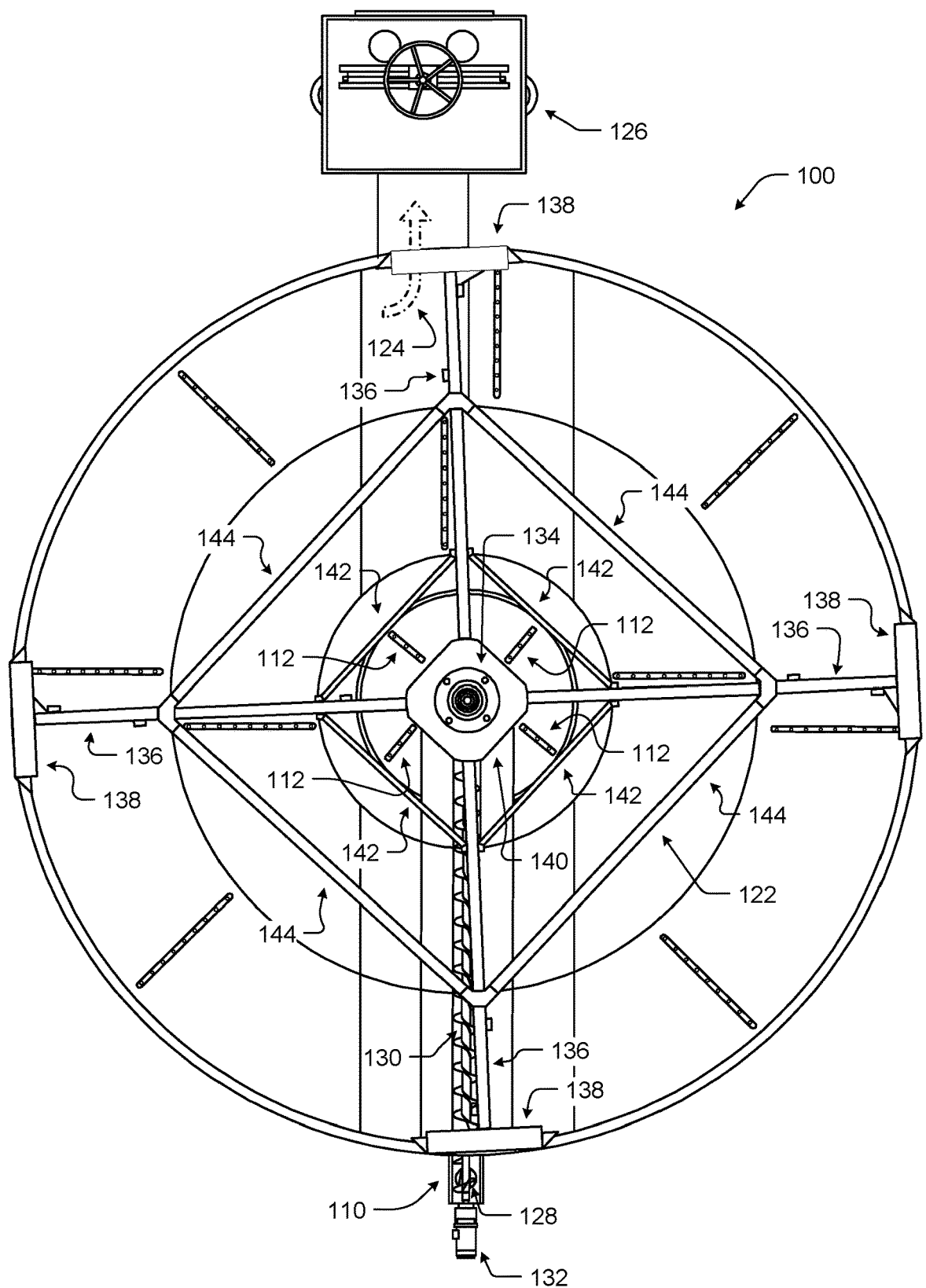
FIG. 2 illustrates another top view of the example system for processing wastewater according to some implementations.

FIG. 2 illustrates another top view of the example system 100 for processing wastewater according to some implementations. In the current example, a scum collection assembly 122 is shown positioned over the system 100. The scum collection assembly 122 may be configured to skim FOGs and solid particles from the surface of the wastewater within each of the flotation zones 104-108 and deposit the FOGs and solid particles into the scum collection trough 110. The scum collection trough 110 may then push the collected FOGs and solid particles out of the system 100 via a discharge port, generally indicated by 128. For example, the scum collection trough 110 may include a screw convey unit 130 to push the FOGs and solid particles towards the discharge port 128. In some cases, a drive motor 132 may be mechanically coupled to the screw convey unit 130. The screw convey unit 130 may include one or more fin plates coupled to a screw beam.

The scum collection assembly 122 may include a drive motor 134 configured to rotate a scum collection assembly 122. The drive motor 134 as well as the assembly 122 may be mounted on a central drive mounting pad 140. In the illustrated example, the scum collection assembly 122 also includes four scraper mounting arms 136, four inner structural beams 142, four outer structural beams 144, four side wall wheel assemblies 138, and a scum scraper (not shown) coupled to each of the scum scraper mounting arms 136. While the illustrated example, has four scarper mounting arms 136, four inner structural beams 142, and four outer structural beams 144, however, it should be understood that in other implementations, different numbers of scarper mounting arms 136, inner structural beams 142, and outer structural beams 144 may be used, such as two or six scraper mounting arms 136, inner structural beams 142, and outer structural beams 144.

In general, as the scum collection assembly 122 is rotated by the drive motor 134, the assembly 122 rotates over flotation zones 104-108 via the four side wall wheel assemblies 138. During the rotations, the scum scrapers mounted below the scum scraper mounting arms 136 push the scum (e.g., the floated. FOGs and solid particles) accumulated on the surface of the wastewater the into the scum collection trough 110. For example, as the scum collection assembly 122 rotates one or more scum scrapers within each of the flotation zones 104-108 may be positioned to push the FOGs and solid particles floated by the microbubbles into the scum collection trough 110. In some applications, the solid content in scum is typically about 6-10%.

In one implementation, the central driving motor 134 may be equipped with a variable frequency drive (VFD) to control the rate or speed of rotation. In one specific implementation, the scum collection assembly 122 may continuously rotate during use. In other cases, the rotation of the scum collection assembly 122 may be parodic, such that the scum collection assembly 122 may rotate for a first predefined period of time and then halt for a second predefine period of time. In some cases, the scum collection assembly 122 may rotate in the clockwise direction, such that the scum collection assembly 122 rotates in the same direction as the flow of the first flotation zone 104 and the third flotation zone 108 (e.g., in the first direction 118) and in the opposite direction as the flow of the second flotation zone 106 (e.g., opposite the second direction 120).

In the current example, the wastewater is shown as flowing out of the third flotation zone 108, generally indicated by 124 into an effluent reservoir or weir tank 126. Thus, the third flotation zone 108 and the weir tank 126 are in fluid communication. For example, as the system 100 removes the FOGs and solid particles from the wastewater, the wastewater is cleaned, and disposable or reusable effluent is produced as the wastewater exits the third flotation zone 108 and enters the weir tank 126. The effluent stored in the weir tank 126 may then be reused, such as when the system 100 is sued in conjunction with oil production operations, or disposed of, such as when the system 100 acts as a municipal wastewater pre-treatment unit.

In the current example, the system 100 also shows the dissolved air diffusers 112 as multiple diffusers arranged evenly around the central column 102. In some cases, the dissolved air diffusers 112, 114, and 116 may be controlled by isolation valves under the system 100. The controls may be used to regulate the amount and rate of formation of microbubbles being introduced into the system 100 at each of the flotation zones 104-108 and/or the central column 102.

It is also important to note that the implementation shown in FIGS. 1 and 2 is a three-ring CZDAOF system 100. However, due to the structural design of CZDAOF units or systems, additional outer rings (e.g., additional flotation zones) may be added to increase the capacity. In one implementation, the ability to add additional rings or flotation zones allows for a design that is modular and has the ability to increase capacity expansion after installation. For example, the CZDAOF system 100 configuration shown in FIGS. 1 and 2 may be expanded to five, seven, or nine-ring systems allowing for more capacity than standard commercial CZDAOF units on the market.

Figure 3:
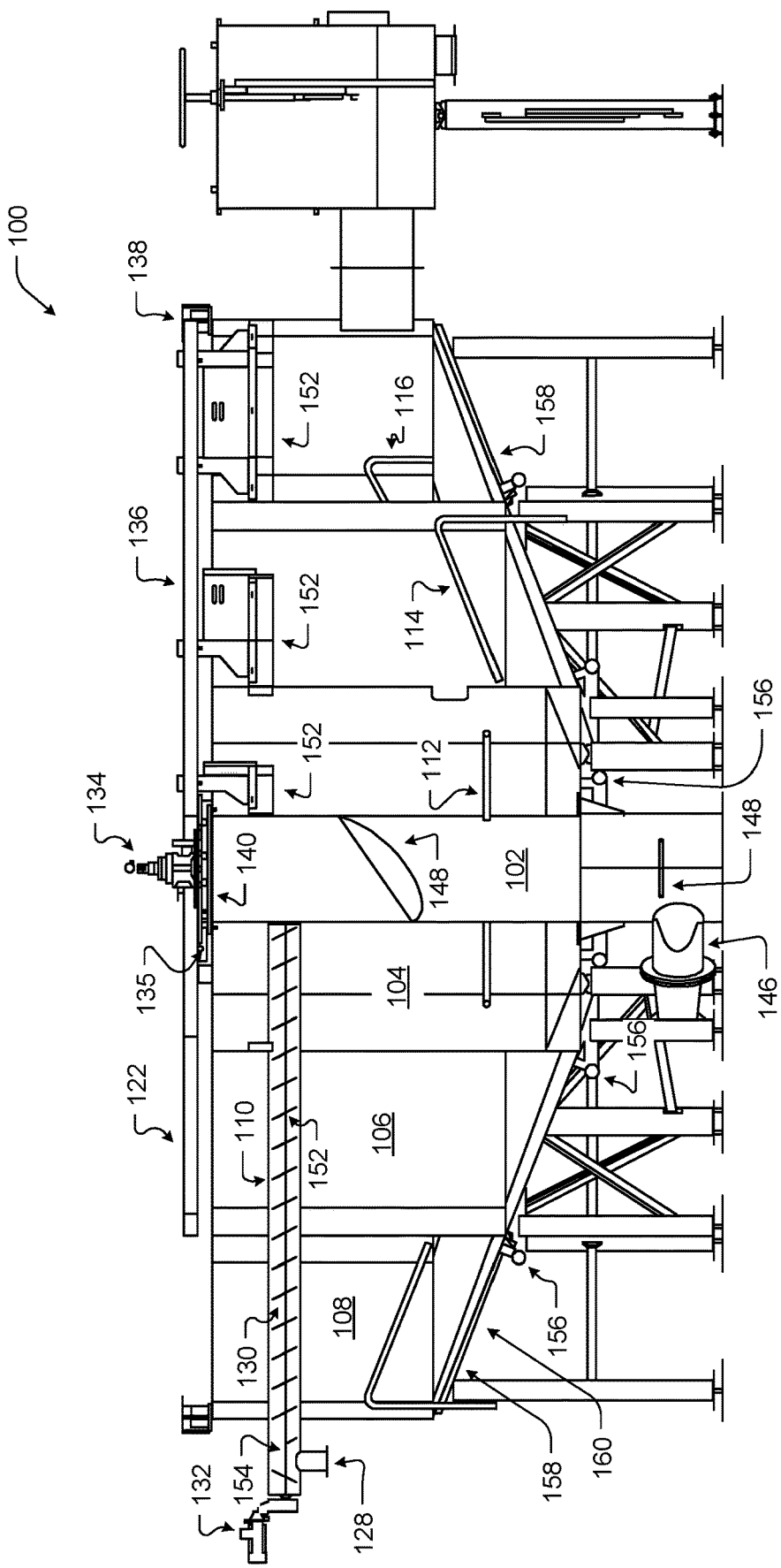
FIG. 3 illustrates a cross-sectional view of the example system for processing wastewater according to some implementations.

FIG. 3 illustrates a cross-sectional view of the example system 100 for processing wastewater according to some implementations. As discussed above, the raw wastewater is received by the CZDAOF system 100 at the central column 102 via an inlet pipe 146. In some implementations, a mixture of dissolved air and/or ozone is introduced into the central column 102 via a diffuser 146 and mixes with the raw FOG-containing effluent. Upon release to the atmosphere, the dissolved air and/or ozone in the recirculated effluent generate numerous micro-size bubbles, as discussed above.

The microbubbles attach on the surface of FOG or suspended sold particles and cause them to float upward. An angular guide plate 150 is mounted within the central column 102 to change the flow direction and eliminate any FOG accumulation on the surface of the central column 102. Further, as illustrated, the central column 102 may be exposed to the atmosphere, via at least openings 135 between the scum collection assembly 122 and a top surface of the central column 102.

In an alternative implementation, the central column 102 may be sealed to prevent the formation of the micro-size bubbles in the received wastewater and/or recirculated effluent until the wastewater and/or the recirculated effluent including the dissolved gaseous material, such as air, ozone, chemicals, and/or other dissolved gaseous elements, is exposed to the atmosphere in the first flotation zone 104. In still other cases, the central column 102 may receive the wastewater but not the recirculated effluent including the dissolved gaseous materials.

As the wastewater exits the central column 102, the wastewater is processed via a series of flotation zones, such as flotation zones 104-108, as discussed above with respect to FIGS. 1 and 2. In each of the flotation zones 104-108, additional microbubbles are introduced to the wastewater to remove additional FOGs and solid particles via the respective diffuser 112-116. The microbubbles attach to and raise the FOGs and solid particles to the surface of the wastewater. The scum collection assembly 122 then skims the surface of the wastewater to collect the floated FOGs and solid particles into the scum collection trough 110 and out via the discharge port 128.

The scum collection assembly 122 may include a drive motor 134 configured to rotate a scum collection assembly 122. The drive motor 134 as well as the assembly may be mounted on a central drive mounting pad 140. In the illustrated example, the scum collection assembly 122 also includes at least one scraper mounting arms 136, at least one corresponding side wall wheel assemblies 138, and one or more scum scrapers 152 mounted below the at least one scum scraper mounting arms 136. In general, as the scum collection assembly 122 is rotated by the drive motor 134, the assembly 122 rotates over flotation zones 104-108. During the rotations, the scum scrapers 152 mounted below the scum scraper mounting arms 136 push the scum (e.g., the floated FOGs and solid particles) accumulated on the surface of the wastewater the into the scum collection trough 110.

The scum collection trough 110 may include a screw convey unit 130 to push the FOGs and solid particles towards the discharge port 128. In some cases, a drive motor 132 may be mechanically coupled to the screw convey unit 130. The screw convey unit 130 may include one or more fin plates 154 coupled to a screw beam 156. In this example, the drive motor 132 may rotate the screw convey unit 130 to move the FOGs and solid particles deposited in the scum collection trough 110 towards the discharge port 128. The collected FOGs and solid particles may then be used or processed, such as when the FOGs include commercially desirable products including oils or yellow grease.

In the illustrated example, the bottom plate of each of the flotation zones 104-108 are sloped to collect bottom sludge that is include in the wastewater received via the inlet pipe 146. In each of the flotation zones 104-108 a bottom sludge assembly 158 is configured to with several sludge discharge ports 156 ports evenly spaced along the circumference of each of the flotation zones 104-108 to collect and discharge the heavy solids and sludge that accumulates on the bottom of each flotation zone 104-108. For example, the bottom plate of each flotation zone 104-108 may be sloped toward the inner zone wall to help heavy solids particles slide toward the sludge discharge ports 156.

In one implementation, the bottom sludge discharge assembly 158 consists of a number of sludge discharge ports 156 and a circular sludge pipe manifold 160. In another implementation, each flotation zone 104-108 may have a separate bottom sludge collection assembly 158.

Figure 4:
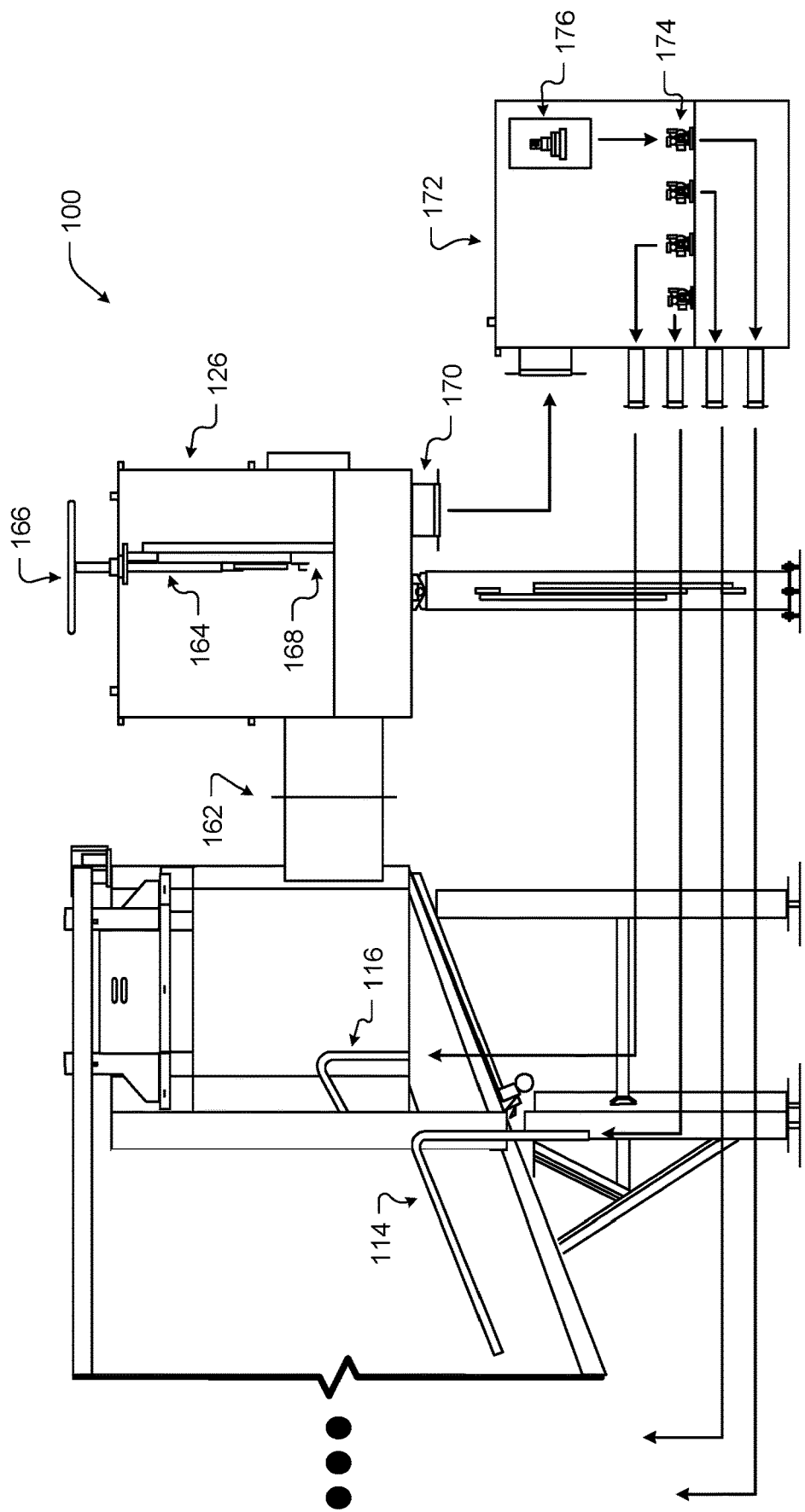
FIG. 4 illustrates a partial cross-sectional view of the example system for processing wastewater according to some implementations.

FIG. 4 illustrates a partial cross-sectional view of the example system 100 for processing wastewater according to some implementations. In the current example, the effluent after having the sludge, heavy solids, FOGs, and solid particles removed exits the system 100 via a channel 162. Upon exiting the system, the effluent is collected in a weir tank 126. The weir tank 126 may include a weir gate 164 that is adjustable via a control value 166 to control the effluent level in the weir tank 164. The treated effluent passes through an opening in the weir gate 164 and is discharged through a discharge port 170.

At least a portion of the treated effluent may be provided to an integrated gaseous material dissolving system 172 for recirculation into the CZDAOF system 100, although other sources of fluid could be used instead of recirculated, treated effluent. In one implementation, the gaseous material could be air and/or ozone, and the dissolving system 172 includes microbubble generators 174 and an ozone generator 176 with associated valves and controls. In one example, the microbubble generators 174 may be connected to the effluent weir tank 126 to receive recirculated, treated effluent as the fluid in which gaseous material is dissolved. For example, the microbubble generators 174 may cause the ozone and/or other gases (e.g., nitrogen and air) to be dissolved into the effluent under high pressure. The effluent including the dissolved gases may then be provided via fluid communication to corresponding dissolved air diffuser, such as diffusers 114 and 116 in the illustrated example. As the effluent including the dissolved gases is exposed to the atmosphere in any or all of the flotation zones 104-108 and/or the central column 102, numerous microbubbles are released and attach to the FOGs and solid particles, as discussed above. In the current example, four microbubble generators 174 are shown. In some cases, each of the microbubble generators 174 may be coupled to the effluent weir box 126 and may dissolve air and/or ozone into a portion of effluent that is then recirculated to the various zones 105-108 and/or the central column 102. In other cases, the microbubble generators 174 may recirculate the effluent to the flotation zones 104-108 but not the central column 102. In still other cases, may recirculate the effluent to select flotation zones 104-108. Thus, in this case, each of the microbubble generators 174 supplies recirculated effluent to each of the zones 105-108 and/or the central column 102. In other examples, each of the individual microbubble generators 174 may be used to dissolve different types of gases into the recirculated effluent, such that microbubbles of different types of gases may be exposed to the wastewater in different flotation zones.

In some case, ozone may be used to produce the microbubbles. For instance, ozone is more soluble in water than air and produces increased microbubbles to float up FOG and solid particles. Additionally, hydroxyl groups created by the ozone can partially oxidize FOG molecules and change the surface properties of FOG molecules. Ozonation can also improve FOG separation efficiency from the wastewater stream or flow. In addition, ozone can also control and eliminate odor during the FOG recovery and removal process. For instance, ozone can also partially oxidize organic matter, and disinfect the bacteria and microorganisms.

In the current example, the ozone generator 176 is illustrated as providing ozone to one of the microbubble generators 174. However, in some implementations ozone may be included or dissolved in the effluent provided to each of the flotation zones 104-118 and/or the central column 102.

Figure 5:
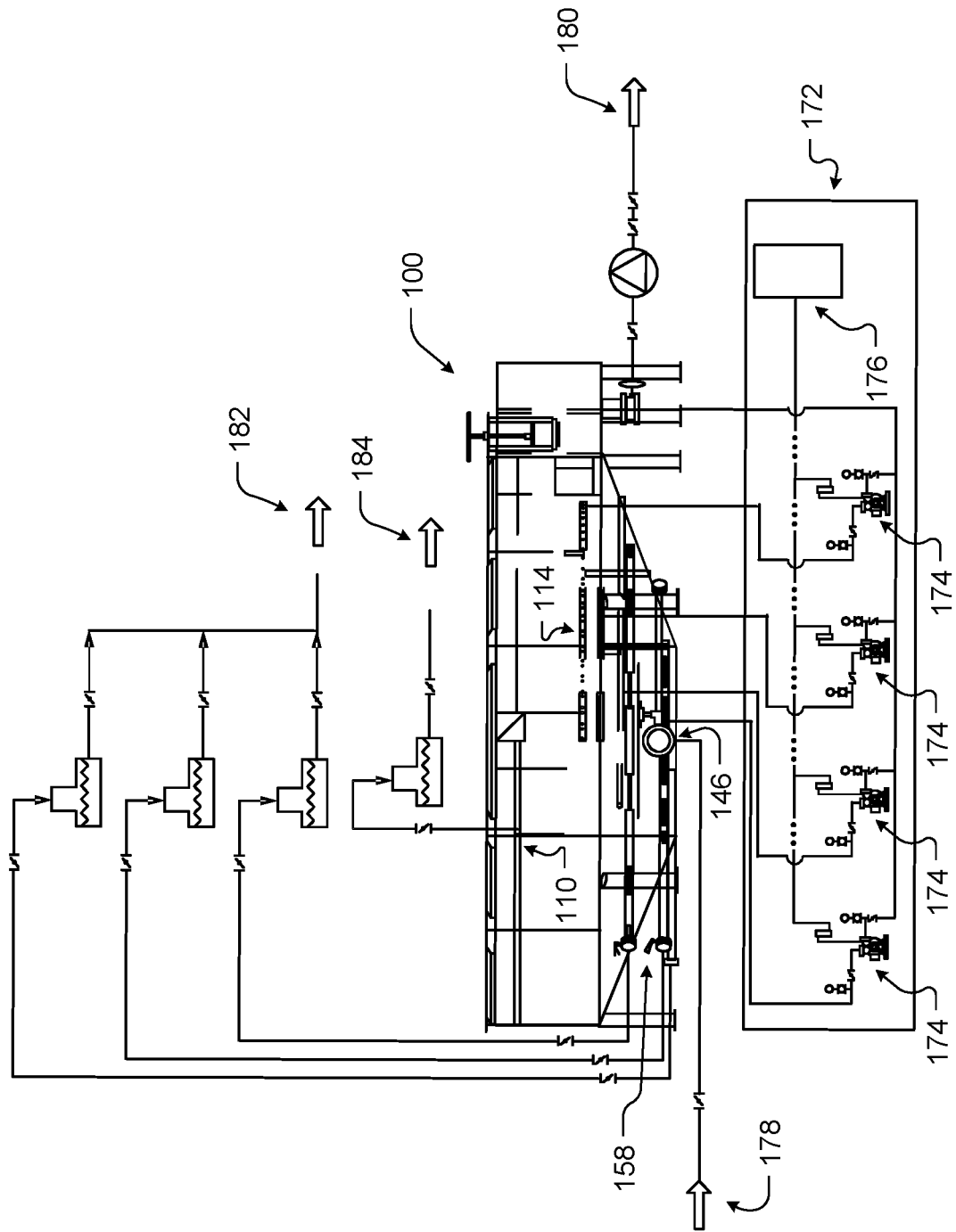
FIG. 5 illustrates an example block diagram of the system of FIGS. 1-4 according to some implementations.

FIG. 5 illustrates an example block diagram of the system 100 of FIGS. 1-4 according to some implementations. In the illustrated example, wastewater 178 is received into the system via the inlet pipe 146 at the central column and treated effluent 180 may exit the system 100 via the discharge pipe 170. Bottom sludge or heavy solids 182 are collected via the bottom sludge discharge assembly 158 and FOGs 184 are collected via the scum collection trough 110.

In the illustrated example, some of the treated effluent 180 may be received by the integrated gaseous material dissolving system 172. As discussed above, the integrated gaseous material dissolving system 172 includes microbubble generators 174 and, in some examples, an ozone generator 176. For example, the microbubble generators 174 may cause the ozone and/or other gases (e.g., nitrogen and air) to be dissolved into the effluent under high pressure. The treated effluent including the dissolved gases may then be provided via fluid communication to corresponding dissolved air diffuser, such as diffuser 114. In this example, each of the individual microbubble generators 174 may be used to dissolve different types of gases into the recirculated effluent, such that microbubbles of different types of gases may be exposed to the wastewater in different flotation zones.

In the current example, the ozone generator 176 is illustrated as providing ozone to each of the microbubble generators 174. However, it should be understood that in some implementations other gases may be used for individual ones of the flotation zones 104-108 and/or the central column 102.

In the examples of FIGS. 1-5 above, the system 100 may be configured to be fabricated using 304L or 316L, stainless steel or a series of duplex stainless. For instance, stainless steel does not need to be painted or coated in some manner, and therefore can be more economical. Further, the circular shape of the system 100 allows the side zone walls to be in hoop stress, enabling the CZDAOF system 100 to be built to almost any diameter using lighter, thinner materials than conventional rectangular CZDAOF units. Additionally, to address potential shipping problems due to size, the system 100 may be fabricated in a number of flanged sections or modules that can be easily transported in pieces and assembled at the construction site. This allows system 100 of any desired diameter to be built and shipped to meet the requirements of the project at hand, and also reduces transportation costs when compared to conventional units.

Figure 6:
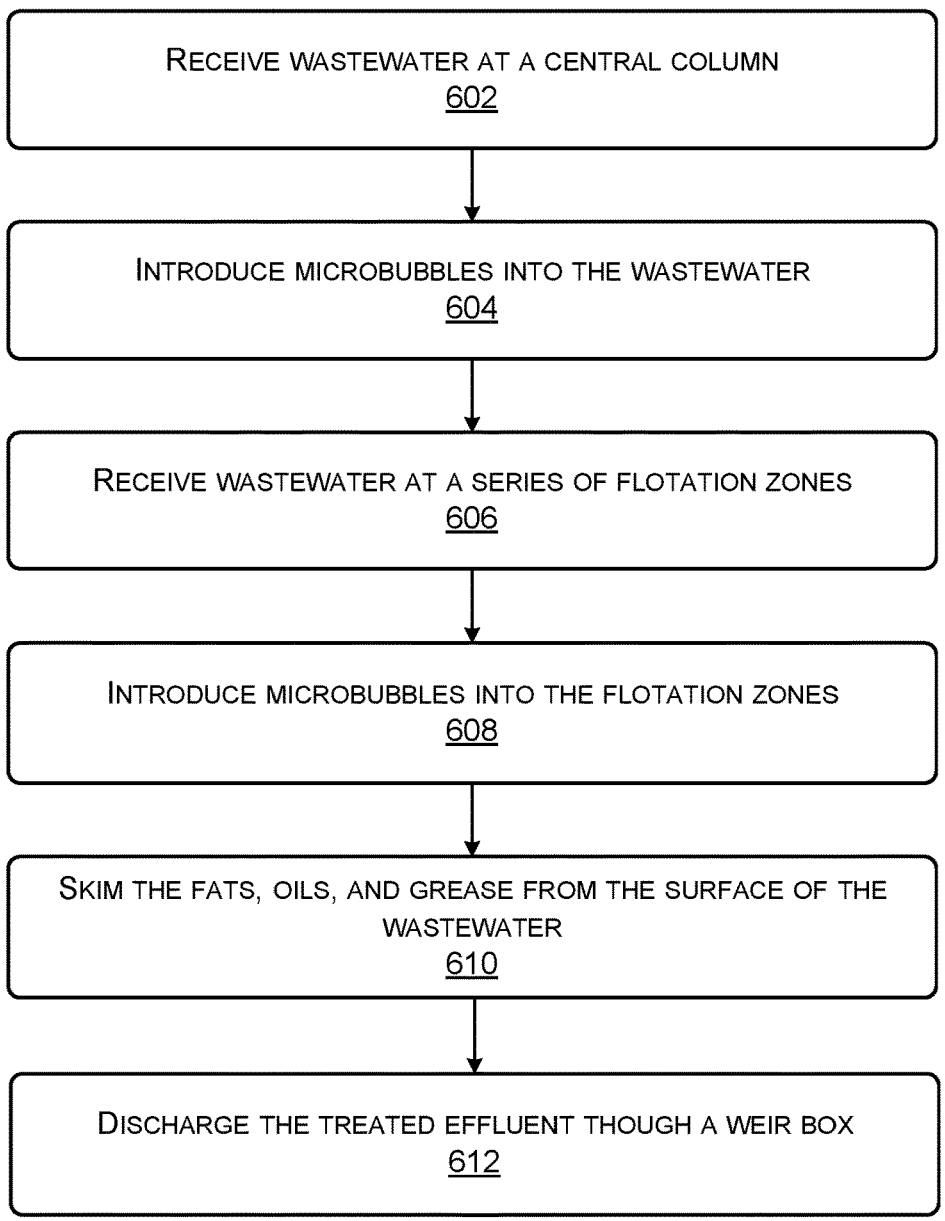
FIG. 6 illustrates an example flow diagram showing a method for processing wastewater according to some implementations.

FIG. 6 is flow diagrams illustrating example processes associated removing FOGs and solid particles from wastewater. The processes are illustrated as a collection of blocks in a logical flow diagram, which represent a sequence of operations, some or all of which can be implemented in hardware, software or a combination thereof. Additionally, the order in which the operations are described should not be construed as a limitation. Any number of the described blocks can be combined in any order and/or in parallel to implement the process, or alternative processes, and not all of the blocks need be implemented.

FIG. 6 illustrates an example flow diagram showing a method 600 for processing wastewater according to some implementations. For example, in some implementations, an CZDAOF system for recovering fat, oil, and grease from wastewater may employ a series of flotation zones in a concentric arrangement about a central column to create progressively increased surface areas for flotation of FOG and solid particles to thereby enhance FOG recovery compared to a conventional unit. In one implementation, the system for recovering FOG from wastewater is configured to produce disposable waste or sludge, usable effluent (e.g., the cleaned waste water), and various FOGs, such as oil and/or yellow grease, that have commercial marketability.

At 602, the system 100 may receive wastewater at a central column 102. For example, a slow upward flow of the influent wastewater from an inlet pipe located near the bottom of the central column 102 allows for gentle flotation of FOG particles due to the low velocity of the wastewater stream within the central column 102.

At 604, the system may introduce microbubbles into the wastewater via the central column 102. In some cases, the central column 102 may include a series of diffusers located near the bottom to enable gas dissolved into the wastewater under pressure by a CZDAOF pump (or microbubble generator 174) to expand in the center column 102 at atmospheric pressure. This allows microbubbles to gently attach to the FOG particles at a very low water velocity (e.g., less than 0.1 to 0.5 feet per second upward velocity), which is beneficial in the non-chemical removal of the FOG. The low velocity of the wastewater in the central column also causes heavy items like chicken or beef parts and bones, and heavy solid particles coming from grease traps, like rocks, plastics, and trash to settle and be trapped in the central column. The heavy solid particles can then be easily removed by a trash pump located at the bottom of the central column 102.

At 606, the system 100 receives the wastewater at a series of flotation zones 104-108. For example, from the central column 102, the wastewater travels through an opening located just below the water line into the first flotation zone 104. Due to the design of the angular guide plate 148 and porting of the wastewater via the opening just below the water line, the directional flow of the water can now be controlled, for maximum removal of the FOG that is floating to the surface. The direction of the wastewater flow in relation to the moving scum scraper assembly 122 assists in collection of the FOGs. For instance, with the system 100, the direction of flow of the wastewater may be controlled to maximize the FOG removal by setting up the entry port ring/wall assembly in every other flotation zone 104-108 to cause the wastewater to run counter-current to the direction of the scum scraper assembly 122. As the wastewater is moving in the opposite direction of the traveling scum scrapers 152 in every other ring, thereby enhancing FOG recovery.

At 608, the system 100 introduces microbubbles into each of the flotation zones 104-108. For instance, the system 100 may control the amount of dissolved air in flotation zones 104-108. For example, an CZDAOF pump 174 is assigned to each flotation zone 104-108. By assigning a separate CZDAOF pump 174 to each flotation zone 104-108 via diffusers 112-116 located at the bottom of each flotation zone 104-108. The exact amount of dissolved air that can be added to each flotation zone 104-108 may be controlled allowing for maximum control of each flotation zone 104-108 while maximizing FOG removal.

The gaseous material dissolving system 172 is designed not only to feed atmospheric gases but is also designed to work on pure nitrogen or ozone. When ozone is added to the flotation zones 104-108, the ozone aids in oil flotation by breaking up the colloidal or emulsified suspended oil solid particles. This allows for higher oil recovery than conventional CZDAOF units, by as much as 15%. Another benefit by dissolving ozone in each flotation zone 104-108 is that the resulting microbubbles maximize contact with the suspended oil particles breaking the oil for recovery. Additionally, the ozone acts as a preservative for the recovered oil, as the ozone kills bacteria that can cause the recovered oil to go rancid during shipment. As the oil is organic matter, bacteria attacks the recovered oil within hours of production, degrading the quality of the oil to be used in manufacturing bio-fuels. With ozone attached, has the oil is now largely protected during shipping due to the disinfecting properties of the ozone. This allows shipment of the oil with confidence that the oil will remain stable for weeks, or possibly months.

In some examples, each flotation zone 104-108 can be individually controlled so that the operator can choose the point of chemical addition. This allows the system 100 to pass the waste stream to be clarified through one or two flotation zones 104 and 106 without chemicals, allowing some or most of the FOG particles to float out in the initial flotation zone(s) using flotation only. For example, chemicals can then be added to the third flotation zone 108 for final polishing. The chemical demand is thereby greatly reduced (e.g., as much as 70%) due to the majority of the particles being removed in the first two stages without the use of chemicals. The potential savings for municipal plants will be seen immediately after the installation, and the new CZDAOF in most cases can rapidly pay for itself due to the chemical savings.

At 610, the system 100 may skim the FOGs from the surface of the wastewater. For example, a scum collection assembly 122 and scum collection trough 110 may be used as discussed above. In some cases, the scum scraper 152 includes a scraper rake design to remove the floated FOGs into the scum collection trough 110. Thus, in contrast to conventional CZDAOF units, the present system 100 having the screw assembly reduces the risk of plugging the float discharge port.

At 612, the system 100 may discharge the treated effluent through a weir box 126. As the treated effluent enters the effluent weir box 126, the treated effluent travels into the filling chamber of the weir box 126. This allow the system 100 to use this treated effluent to recirculate back to the CZDAOF pumps 174. As this filling chamber reaches maximum threshold or holding capacity, the treated effluent then overflows the adjustable weir gate and into an outfall chamber. This allows control of the water level in the system 100 for maximum oil removal.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising: a central column in fluid commination with at least one inlet for receiving wastewater and for allowing the formation of first microbubbles in the wastewater through a first diffuser; a first flotation zone in fluid commination with the central column, the first flotation zone allowing a formation of second microbubbles in the wastewater through a second diffuser; a second flotation zone in fluid commination with the first flotation zone, the second flotation zone allowing a formation of third microbubbles in the wastewater through a third diffuser; a third flotation zone in fluid commination with the second flotation zone, the third flotation zone allowing a formation of fourth microbubbles in the wastewater through a fourth diffuser; an effluent weir tank in fluid communication with the third flotation zone for receiving treated effluent and controlling the water level of the system; and at least one pump for dissolving gaseous material in fluid, the dissolved gaseous materials causing the formation of the first microbubbles upon de-compression in or near the first diffuser, the second microbubbles upon de-compression in or near the second diffuser, the third microbubbles upon de-compression in or near the third diffuser, and the fourth microbubbles upon de-compression in or near the fourth diffuser and the at least one pump in fluid communication with at least one of the central column, the first flotation zone, the second flotation zone, and the third flotation zone.

2. The system as recited in claim 1, where at least a portion of the fluid that is to be used in conjunction with the pump for dissolving gaseous material to form the first microbubbles, the second microbubbles, the third microbubbles, and the fourth microbubbles comprises the treated effluent.

3. The system as recited in claim 1, where at least a portion of the fluid that is to be used in conjunction with the pump for dissolving gaseous material to form the first microbubbles, the second microbubbles, the third microbubbles, and the fourth microbubbles comprises fluid is-received from at least one of the central column, the first flotation zone, the second flotation zone, the third flotation zone, and the effluent weir tank, wherein the pump is in fluid communication with at least one of the fluids therein.

4. The system as recited in claim 1, wherein the dissolving gaseous material in fluid is at least one of air, ozone, oxygen, or nitrogen.

5. The system as recited in claim 1, where at least one of the first diffuser, the second diffuser, the third diffuser, or the fourth diffuser is circular.

6. The system as recited in claim 1, wherein the central column comprises an angular guide plate to reduce fat, oil, and grease accumulation within the central column.

7. The system as recited in claim 1, wherein at least one the first flotation zone, the second flotation zone, and the third flotation zone includes a bottom sludge discharge manifold coupled to a sloped bottom plate for collecting heavy solid particles and sludge.

8. The system as recited in claim 1, further comprising chemical injection ports in at least one of the central column, the first flotation zone, the second flotation zone or the third flotation zone.

9. The system as recited in claim 1, further includes an ozone generator for supplying ozone to the at least one pump for dissolving gaseous material.

10. The system as recited in claim 1, further comprising:
 a scum collection trough to receive fats, oils, and/or grease, the scum collection trough including:
 a screw conveyor to move the fats, oils, and/or grease out of the system via a discharge port;
 a scum scraper assembly mounted over the system, the scum scraper assembly including:
 a drive motor for rotating the scum scraper assembly;
 at least one scraper mounting arm; and
 at least one scraper mounted to the bottom of the mounting arm, the at least one scraper to push the fats, oils and grease floating at the surface of the wastewater into the scum collection trough.

* * * * *